Patented Jan. 27, 1953

2,626,943

UNITED STATES PATENT OFFICE 2,626,943

STABILIZING POLYMERIZED METHYL VINYL KETONE

Irving Skeist and Samuel B. McFarlane, Summit, N. J., assignors to Celanese Corporation of America, a corporation of Delaware No Drawing. Application February 5, 1949, Serial No. 74,858

1 Claim. (Cl. 260—63)

This invention relates to the preparation of polymers, and relates more particularly to the preparation of polymerized methyl vinyl ketone.

As is well known, methyl vinyl ketone can be polymerized in bulk to form a solid mass, in organic solvents to form a solution, or in an aqueous medium, in the presence of an emulsifying agent, to produce a latex. While bulk polymerization is the simplest technique on a laboratory scale, its translation to the production of large masses of polymer, i. e., to production on a commercial scale, involves serious engineering problems because of the difficulties in removing the heat produced during the exothermic polymerization reaction. Polymerization in organic solvents, while seemingly an ideally direct method for the preparation of solutions of the polymer, is unsatisfactory since the polymers formed are of very low molecular weight and the solutions are contaminated by unpolymerized monomer. Emulsion polymerization is easy to control and yields polymers of high molecular weight, but heretofore it has been considered necessary to have an emulsifying agent present in the reaction mass to prevent the agglomeration and separation of the polymer from the reaction medium. If such separation occurs to any appreciable extent no satisfactory latex will be formed, the separated polymer will be contaminated with unreacted monomer, and when large quantities of polymer are being produced, the problem of heat removal will become difficult. Not only does the emulsifying agent represent an added expense, but its presence in the polymer is undesirable for many purposes. Removal of the emulsifying agent after polymerization is made difficult by the low softening temperature of the polymer, and by its tendency to agglomerate to form an impenetrable "gunk." Moreover, many emulsifying agents tend to inhibit the polymerization of methyl vinyl ketone and cannot be employed during the polymerization, despite the many advantages they possess when present in some compositions containing the polymerized material.

An important object of this invention is the preparation of polymerized methyl vinyl ketone by a novel process which will be free from the foregoing and other disadvantages of the methods heretofore employed.

Another object of this invention is the preparation of latices of polymerized methyl vinyl ketone emulsified solely with emulsifying agents which inhibit the polymerization of methyl vinyl ketone.

A still further object of this invention is the preparation of stabilized latices of polymerized methyl vinyl ketone.

Other objects of this invention will be apparent from the following detailed description and claim.

We have now discovered that by controlling the reaction conditions, the emulsion polymerization of methyl vinyl ketone in an aqueous medium to produce a latex may be carried out in the absence of emulsifying agents. To achieve these results, the polymerization is effected in an aqueous solution of the monomer containing at least about 3 parts by weight of water for each part by weight of the methyl vinyl ketone. A larger proportion of water may be present in the reaction medium, but it is undesirable to employ more than about 10 parts by weight of water for each part by weight of the methyl vinyl ketone since the latex produced, when a greater quantity of water is employed, will be too dilute for commercial purposes. On the other hand, when a smaller proportion such as about 2 parts by weight of water is present in the reaction medium for each part by weight of the methyl vinyl ketone, the polymer will agglomerate to form a "gunk" containing a large quantity of unreacted monomer. The polymerization is preferably effected under an inert atmosphere at temperatures of from about 20 to 95° C., and in the presence of from about 0.0005 to 0.002 part by weight of a suitable polymerization catalyst for each part by weight of the methyl vinyl ketone.

Methyl vinyl ketone is the only vinyl ketone that can be polymerized in this manner since it is miscible with water in all proportions at room temperature, whereas other vinyl ketones are soluble in water to a maximum of only 3 to 5% at room temperature. The monomeric methyl vinyl ketone should be carefully purified before being dissolved in the reaction medium, since impurities may tend to retard polymerization, and also result in a polymer which is not readily soluble in organic solvents. Purification may also be necessary to remove any polymerization inhibitors which are added to the monomer to prevent its premature polymerization during shipping and storage. The most effective method for purification is to distill the monomer, discarding the low- and high-boiling fractions thereof, although other methods of purification may also be employed.

As a polymerization catalyst we prefer to employ the alkali metal and ammonium persulfates since they give the highest yields of polymer as a latex in the shortest periods of time. However, other catalysts which are useful are the alkali metal and ammonium perborates, although they require a longer period of time to give a comparable yield of polymer as a latex. In addition to the polymerization catalyst, the reaction mixture may contain, for each part by weight of the methyl vinyl ketone, from about 0.0001 to 0.001 part by weight of an alkali metal or ammonium metabisulfite, or a mixture of ferrous ammonium sulfate with sorbose, which will act as a "redox" system and shorten or eliminate the initial induction period before polymerization begins. There may also be present in the reaction mixture, for each part by weight of the methyl vinyl ketone, from about 0.0001 to 0.01 part by weight of a "regulator" or "chain transfer agent," such as lauryl mercaptan, thioglycollic acid or butyl mercaptan, which serves to stop the growth of the polymer chains and initiate the formation of new chains thereby limiting the chain length and insuring the solubility of the polymer in organic solvents such as acetone, methyl ethyl ketone, ethyl acetate, etc.

When a polymerization catalyst having an acid reaction, such as a persulfate is employed, it is desirable to render the reaction mixture slightly alkaline after the polymerization is substantially complete. This reduces the tendency of the polymer to discolor upon being heated for an extended period of time even after it has been thoroughly washed. Various alkaline materials may be employed to render the reaction mixture slightly alkaline, but it is preferred to employ dilute solutions ranging up to about 0.5% by weight of weakly alkaline substances such as sodium bicarbonate or sodium acetate, or the equivalent potassium salts for this purpose, since more concentrated solutions and more strongly alkaline materials will tend to insolubilize the polymer. The reaction mixture can be rendered slightly alkaline with only the stoichiometric quantity of alkali required to neutralize the catalyst plus a very slight excess, but best results are obtained by using a larger excess thereof in a quantity depending upon the manner in which the latex is to be employed. If the water is to be separated from the latex by evaporation, from about 2 to 3 times the stoichiometric quantity of alkali required to neutralize the catalyst will be found adequate for this purpose. On the other hand, if the polymer is to be coagulated and the aqueous phase drained away, from about 10 to 20 times the stoichiometric quantity of alkali required to neutralize the catalyst will be necessary.

The polymerized methyl vinyl ketone latex has a tendency to agglomerate in the presence of electrolytes or even of some non-ionic materials such as starch. It has been found possible to prevent or minimize premature agglomeration of the polymer by mixing the latter with a small amount of an emulsifying agent such as a dispersing agent or protective colloid after polymerization is complete. Among the materials which are suitable for this purpose are sodium dioctyl sulfosuccinate, cetyl dimethyl benzyl ammonium chloride, polyoxy alkylene ether of partial oleic acid ester, casein, sodium oleate and polyvinyl alcohol. Thus, the addition of 10% by weight (dry basis) of an alkaline solution of casein stabilizes the latex so that it may be mixed with starch or with any other material that does not precipitate casein. Since many emulsifying agents, such as sodium oleate and polyvinyl alcohol, tend to inhibit the polymerization of methyl vinyl ketone, they should not be present in the reaction mass during polymerization. Moreover, even if the emulsifying agent is of the type which does not inhibit the polymerization of methyl vinyl ketone and it can, therefore, be present in the reaction mass during polymerization, its presence in the latex may be undesirable for other reasons. For example, if the latex contains a cationic emulsifying agent, such as cetyl dimethyl benzyl ammonium chloride, an anionic emulsifying agent such as sodium dioctyl sulfosuccinate, cannot be added to the latex since it will precipitate the cationic emulsifying agent breaking the latex. Similarly, a cationic emulsifying agent cannot be added to a latex containing an anionic emulsifying agent. By adding the emulsifying agent to the latex only after polymerization is complete, a much wider variety of emulsifying agents may be employed without encountering any of these difficulties.

The polymerized methyl vinyl ketone may be separated from the aqueous phase in a number of different ways. For example, the latex may be spread in a layer having a thickness, when dried, of less than 0.001 inch on a smooth glass or metal base suitably lubricated and the water evaporated by gentle heating. After cooling, a smooth, transparent and colorless foil of polymer may be stripped from the base. The latex may also be spray dried in equipment of conventional type. By the addition of an organic solvent in which the polymer is soluble, such as acetone or ethyl acetate, the latex can be separated into two phases, one containing the bulk of the polymer dissolved in the solvent, and the other containing a small amount of the polymer and water. The phase containing the polymer and organic solvent may be separated mechanically from the aqueous phase and employed without further treatment wherever a solution of the polymerized methyl vinyl ketone is needed. The latex may also be coagulated by violent agitation, by freezing and thawing, or by the addition of strong electrolytes such as sodium chloride in concentrations exceeding about 1%. Any water remaining in the coagulum may then be separated by working the coagulum for between about 15 to 30 minutes on heated rolls maintained at a temperature of between about 105 to 115° C. The polymerized methyl vinyl ketone produced in this manner is soluble in various organic solvents such as acetone, methyl ethyl ketone, ethyl acetate, butyl acetate and dioxane. However, if desired it may be readily insolubilized by treatment with strong acids or alkalis in aqueous or alcoholic solutions.

The polymerized methyl vinyl ketone latex may be employed, either as produced or after dilution with water, with or without the admixture of other materials, as an adhesive, giving excellent bonds between paper and paper, paper and cardboard, paper and cellulose ester films, cardboard and cellulose ester films, paper and metal, and paper and glass. It may also be employed for the production of coatings on paper, cardboard, leather, gelatin, regenerated cellulose and cellulose ester films; or in coatings exceeding 0.003 inch in thickness on metal and glass, which, after drying, are tough and closely adherent.

The polymerized methyl vinyl ketone latices are also useful either alone, or in combination with other materials such as starch, glue, gelatin, casein, etc., as a paper size. They may be incorporated in the pulp from which the paper is produced to thoroughly permeate the same, or they may be applied to the paper after the latter has been formed. Not only does the polymerized methyl vinyl ketone act as a size, but it also serves to improve the wet strength of the paper to which it is applied. If it is desired to concentrate the polymer at the surface of the paper, a latex of the polymer may be applied to paper which has been sized previously.

The polymerized methyl vinyl ketone latices may also be employed as permanent textile sizes or stiffening agents which are not removed during laundering. Textile materials sized with said polymerized methyl vinyl ketone are particularly adapted for the production of chintz curtains, bedsheets, men's shirt collars and other related items, requiring no starching after each laundering. They may also be employed as box toe shoe stiffeners. When textile materials having a thin or loose weave, such as hosiery lace or cheesecloth, are sized with polymerized methyl vinyl ketone latices they exhibit a lesser tendency to snag and run and will, therefore, have a longer service life. The polymerized methyl vinyl ketone is preferably applied to the textile materials by dipping the latter into the latex. The quantity of polymer absorbed by the textile material may be varied by adjusting the concentration of the polymer in the latex and/or the length of the time during which the latex and the textile material remain in contact.

By employing latices of polymerized methyl vinyl ketone instead of solutions thereof in organic solvents, as adhesives, sizes and stiffening agents, we eliminate the expense of said solvents which may be considerable. In addition we avoid the explosion and health hazards which the use of many of these solvents entails, and the expense of the solvent recovery equipment they require. Latices of polymerized methyl vinyl ketone also have a wider applicability than solutions of the polymer in organic solvents, since the organic solvents present in said solutions will dissolve or attack many materials such as cellulose acetate or polymethyl methacrylate, which it is desired to coat or otherwise treat with polymerized methyl vinyl ketone.

In order further to illustrate our invention but without being limited thereto, the following examples are given:

*Example I*

To 300 parts by weight of distilled or deionized water there is added 100 parts by weight of dry distilled methyl vinyl ketone and 0.1 part by weight of potassium persulfate. The mixture is sealed under nitrogen and agitated slowly for 16 hours at a temperature of 60° C. There is obtained a latex of polymerized vinyl ketone in a yield of over 90%.

*Example II*

To 100 parts by weight of the latex obtained in Example I there is added 5 parts by weight of a 0.5% by weight aqueous solution of sodium bicarbonate. The polymerized methyl vinyl ketone is then separated from the latex by evaporating the water therefrom. Upon heating the polymerized methyl vinyl ketone for one hour at a temperature between 110–120° C., it exhibits substantially no discoloration, whereas a polymerized methyl vinyl ketone that has not been treated with an alkaline material turns amber upon being heated in this manner.

*Example III*

To 500 parts by weight of distilled or deionized water there is added 100 parts by weight of dry distilled methyl vinyl ketone and 0.1 part by weight of sodium perborate. The mixture which is almost neutral is sealed under nitrogen and agitated slowly at a temperature of 60° C. At the end of 16 hours there is obtained a yield of polymerized methyl vinyl ketone of about 11%, but the yield may be readily increased by lengthening the reaction period. The latex when spread on glass and dried leaves a clear and colorless film.

*Example IV*

To 400 parts by weight of distilled or deionized water there is added 100 parts by weight of dry distilled methyl vinyl ketone, 0.1 part by weight of potassium persulfate and 0.5 part by weight of lauryl mercaptan. The mixture is sealed under nitrogen and agitated slowly for 16 hours at a temperature of 60° C. There is obtained a latex of polymerized methyl vinyl ketone in a yield of over 90%. The solubility characteristics of the polymer produced in the presence of lauryl mercaptan are superior to those obtained when polymerization is carried out in the absence of this material.

*Example V*

A pulp board having a thickness of 0.2 inch is dipped for 1 minute into a latex of polymerized methyl vinyl ketone having a solids content of 15%. The pulp board picks up 20% of its weight of polymer, and after drying, is stiff and accepts writing ink without feathering.

*Example VI*

A filter paper is dipped for 1 minute into a latex of polymerized methyl vinyl ketone having a solids content of 10%. After drying at a temperature of 100° C., the filter paper exhibits a wet strength superior to that of the untreated paper.

*Example VII*

Close woven cotton broadcloth is immersed for 1 minute in a latex of polymerized methyl vinyl ketone having a solids content of 15%. The cloth picks up 9% of its weight of polymer, and, after drying, is stiff to the hand. The treated cloth loses none of its weight and retains its stiffness when boiled for 5 minutes in a 1% green soap solution, whereas a starched cloth loses all of its stiffness when treated in the same manner.

*Example VIII*

Cheesecloth is immersed for 1 minute in a latex of polymerized methyl vinyl ketone having a solids content of 1%. The cloth picks up 6.4% of its weight of polymer. After drying, the cloth is tested for resistance to snagging by scraping with a piece of sandpaper coated with #3 grit and wrapped on a 1 inch mandrel. The treated cloth retains its shape after such treatment, whereas an untreated cloth is badly distorted and snagged by the same treatment.

It is to be understood that the foregoing detailed description is given merely by way of illustration and that many variations may be made therein without departing from the spirit of our invention.

Having described our invention, what we desire to secure by Letters Patent is:

Process for stabilizing polymerized methyl vinyl ketone which is in the form of an aqueous latex and which has been prepared by the polymerization of methyl vinyl ketone, free from other polymerizable materials, in the presence of a persulfate polymerization catalyst having an acid reaction, which comprises treating the latex containing the polymerized methyl vinyl ketone with from about 10 to 20 times the stoichiometric quantity of sodium bicarbonate required to neutralize said polymerization catalyst, coagulating the polymerized methyl vinyl ketone, and draining off the aqueous phase.

IRVING SKEIST.
SAMUEL B. McFARLANE.

REFERENCES CITED

The following references are of record in the file of this patent:

UNITED STATES PATENTS

| Number | Name | Date |
|---|---|---|
| 2,227,163 | Starck | Dec. 31, 1940 |
| 2,270,024 | Renfrew et al. | Jan. 13, 1942 |
| 2,289,540 | Dittmar et al. | July 14, 1942 |
| 2,339,184 | Neher | Jan. 11, 1944 |
| 2,380,476 | Stewart | July 31, 1945 |
| 2,416,440 | Fryling | Feb. 25, 1947 |
| 2,436,926 | Jacobson | Mar. 2, 1948 |
| 2,449,489 | Larson | Sept. 14, 1948 |
| 2,462,354 | Brubaker et al. | Feb. 22, 1949 |
| 2,546,238 | Richards | Mar. 27, 1951 |

FOREIGN PATENTS

| Number | Country | Date |
|---|---|---|
| 494,772 | Great Britain | Nov. 1, 1938 |
| 577,317 | Great Britain | May 14, 1946 |
| 577,326 | Great Britain | May 14, 1946 |